United States Patent [19]

Mastner

[11] Patent Number: 4,639,662
[45] Date of Patent: Jan. 27, 1987

[54] THYRISTOR CIRCUIT FOR CURRENT REGULATION

[75] Inventor: Georg Mastner, Niederrohrdorf, Switzerland

[73] Assignee: BBC Brown, Boveri & Company, Limited, Baden, Switzerland

[21] Appl. No.: 639,000

[22] Filed: Aug. 9, 1984

[30] Foreign Application Priority Data

Aug. 18, 1983 [CH] Switzerland .......... 4509/83

[51] Int. Cl.⁴ .............................. G05F 1/32
[52] U.S. Cl. .................... 323/343; 323/209; 323/258
[58] Field of Search ............. 323/255, 258, 340, 343, 323/209, 210, 211, 217, 218; 363/67, 85, 86, 128, 84, 130

[56] References Cited

U.S. PATENT DOCUMENTS

| | | | |
|---|---|---|---|
| 3,195,038 | 7/1965 | Fry | 323/343 |
| 3,955,134 | 5/1976 | Woodford | 323/210 |
| 4,173,039 | 10/1979 | Sun et al. | 363/84 |
| 4,503,380 | 3/1985 | Thanawala | 323/210 |
| 4,560,917 | 12/1985 | Gyugyi | 323/255 |

*Primary Examiner*—Clifford C. Shaw

*Attorney, Agent, or Firm*—Oblon, Fisher, Spivak, McClelland & Maier

[57] ABSTRACT

A thyristor circuit including a primary winding and at least one secondary winding and first and second bipolar thyristor switches connected across respective connections of the secondary winding. The first bipolar thyristor switch bridges $N_1$ turns of the secondary winding, while the second bipolar thyristor switch bridges $N_2$ turns of the secondary winding, wherein $N_2$ is less than $N_1$. The product between the maximum forward current of the second bipolar switch and the number of turns $N_2$ is greater than the product between the latching current of the first bipolar thyristor switch and the number of turns $N_1$ thereof. The second bipolar thyristor switch thus makes it possible to short-circuit the portion of the secondary winding bridged thereby, for operation as a switchable choke, e.g. in a reactive compensator, or as a variable power supply when supplemented by additional components. The second bipolar thyristor switch which bridges a smaller number of windings than the first bipolar thyristor switch expands the operational range of the thyristor circuit and finds particular utility in providing a regulated d.c. power supply.

6 Claims, 6 Drawing Figures

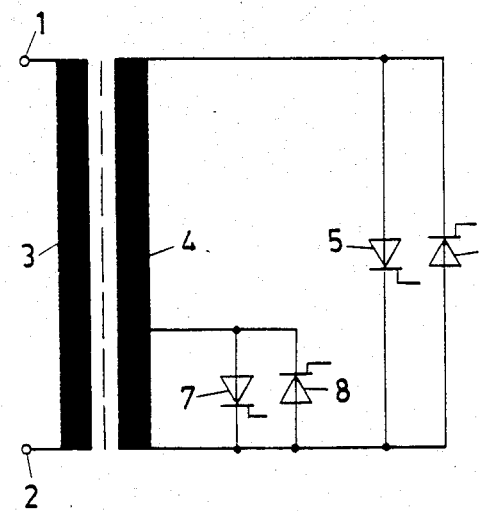
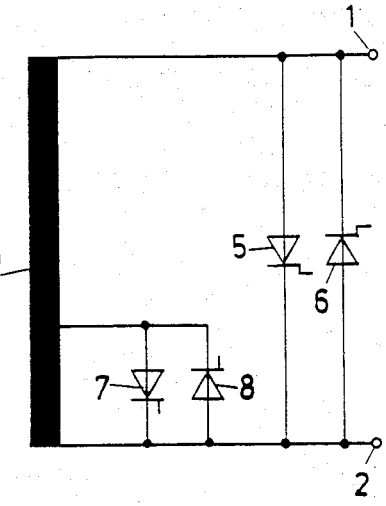
FIG.1  FIG.2
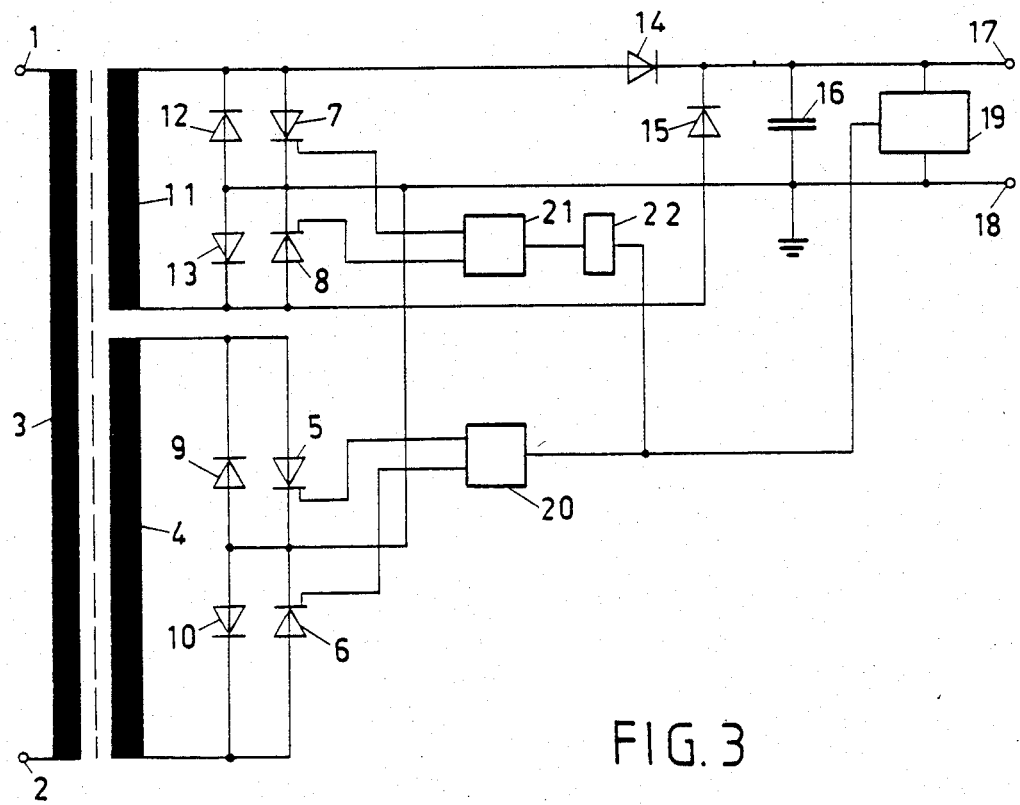
FIG.3

THYRISTOR CIRCUIT FOR CURRENT REGULATION

BACKGROUND OF THE INVENTION

Field of the Invention:

The invention relates to a thyristor circuit including a transformer having a primary winding connected to an electric circuit and a secondary winding connected to a bipolar thyristor switch.

Such thyristor circuits, in various embodiments, can serve directly or indirectly, i.e., by inductive coupling, as switchable or short-circuitable inductances in an ac circuit, e.g., as switchable chokes in a reactive compensator or also, provided with suitable additional components, as variable power supply devices, which draw a regulated dc voltage from an ac circuit.

A thyristor circuit as above noted is known (U.S. Pat. No. 4,173,039), and is designed as a variable power supply device, with a primary winding, placed between two primary connections, through which an alternating current flows, and two secondary windings inductively closely coupled both with the primary winding and with one another, the first of which is parallel to a bipolar thyristor switch which is controlled a firing pulse generator, and a second of which charges a capacitor by a full-wave rectifier. A regulating circuit triggers the firing pulse generator as soon as the voltage on the capacitor exceeds a preset value. The first secondary winding is then short-circuited by the thyristor switch. Thereupon, the second secondary winding, because of the close inductive coupling with the first winding, delivers no further charging current.

Such thyristor circuits are subject to the limitation that the amount of the current flowing between the primary connections must be in a range which is limited upward by the fact that the current flowing through the thyristor switch must not exceed the maximum forward voltage of the switch, and is limited downward by the fact that it must reach at least the latching current of the thyristor switch at the firing times. When these limits are exceeded either upward or downward, the thyristor switch is threatened with destruction or not firing, with possibly fatal consequences. With power supply devices, for example, exceeding of the maximum allowable output voltage and destruction of the connected devices can result.

This results in a limitation in regard to the range in which the primary current can vary, which excludes the usual thyristor circuits from certain applications.

The object of this invention is to provide a novel thyristor circut, in which the admissible range of variation of the primary current is expanded in comparison with known thyristor circuits.

This object, and others, are achieved according to the invention by providing a novel thyristor circuit including a transformer having plural inductively coupled windings, wherein a first winding is provided with two primary connections for connection to an electric circuit, and at least a first bipolar thyristor switch which is placed between two connections of a second winding. The thyristor circuit further includes at least a second bipolar thyristor switch which is placed between two other connections of the second winding, wherein the number ($N_2$) of windings between the connection between which the second bipolar thyristor switch is placed, is in each case smaller than the number ($N_1$) of windings between the connections, between which the first bipolar thyristor switch, or immediately preceding bipolar switch in the case of more than two such switches, is placed.

The advantages obtained by the invention are especially to be seen in that it provides thyristor circuts whose range of application is substantially expanded in comparison with usual thyristor circuits. Many problems are amenable in general only to the thyristor circuits according to the invention, e.g., dc voltage supply from a high-voltage line with occasionally greatly varying power supply.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a circuit diagram of a thyristor circuit according to the invention including two inductively coupled windings and bipolar thyristor switches which provide a switchable inductance;

FIG. 2 is a circuit diagram of a thyristor circuit according to the invention, whereby a switchable inductance is designed with a single winding;

FIG. 3 is a circuit diagram of a thyristor circuit according to the invention designed as a regulated power supply device;

DESCRIPTION OF THE PREFERRED EMBODIMENTS

Figure 4:
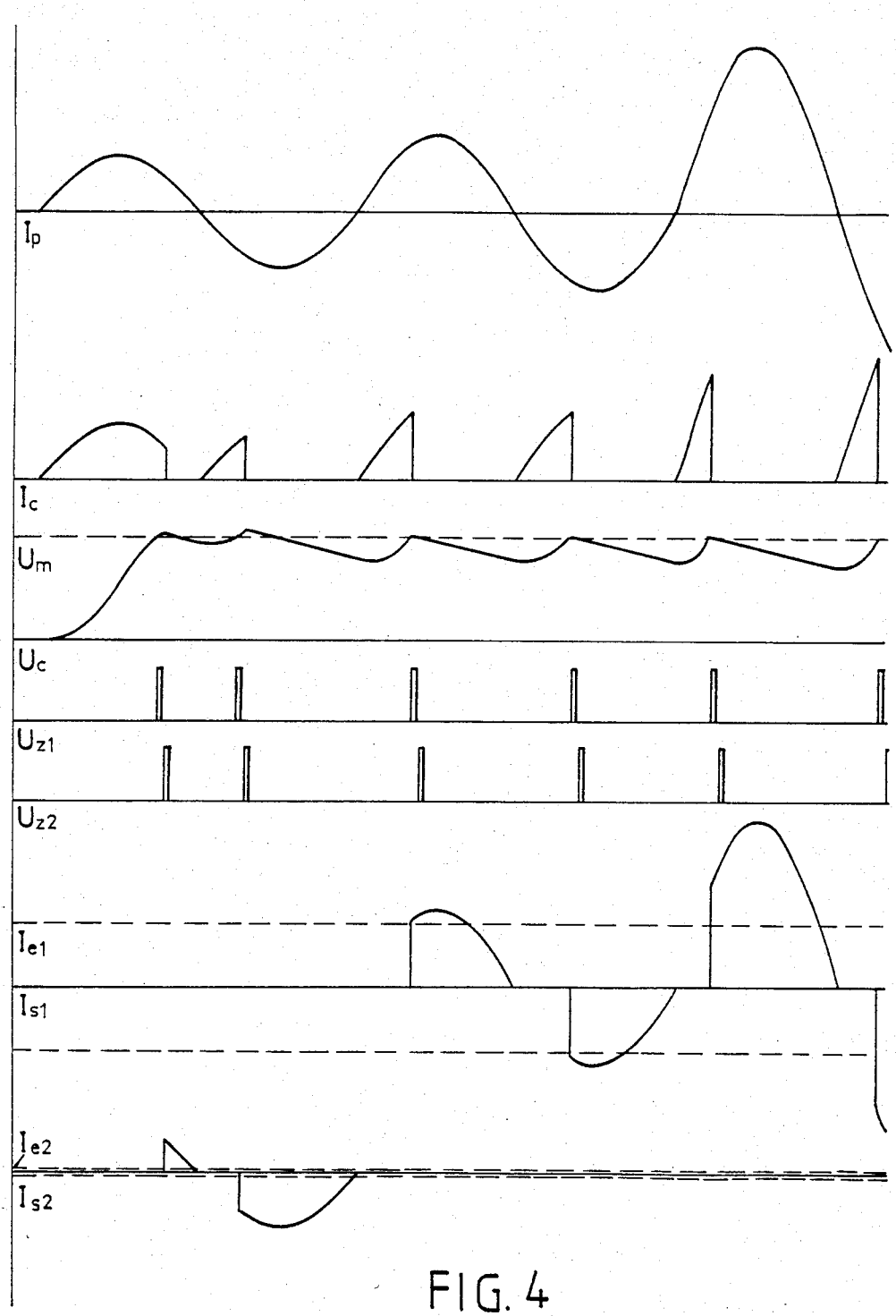
FIG. 4 is a waveform timing diagram illustrating the time pattern of several currents and voltages occurring in the thyristor circuit according to FIG. 3 and FIGS. 5 and 6, are circuit diagrams of possible embodiments for control units or firing pulse generators of the power supply device according to FIG. 3.

Referring now to the drawings, wherein like reference numerals designate identical or corresponding parts throughout the several views, and more particularly to FIG. 1 thereof, the thyristor circuit according to FIG. 1 exhibits in its basic design a first primary connection 1 and a second primary connection 2 between which a primary winding 3 with $N_O$ windings is placed. Primary winding 3 is inductively closely coupled with a secondary winding 4 with $N_1$ turns, with which a first bipolar thyristor switch is parallel and which is embodied as a pair of antiparallel inserted thyristors 5, 6.

According to the invention, the thyristor circuit exhibits a second bipolar thyristor switch, which is also formed from two antiparallel inserted thyristors 7, 8 and bridges a part of secondary winding 4, which contains $N_2 << N_1$ turns. If current does not flow in any part of the secondary winding, the thyristor circuit, placed in an electric circuit with the primary connections, acts as inductance having a magnitude equal to the self-inductance of primary winding 3.

If the first thyristor switch 5, 6 conducts and secondary winding 4 short-circuits, on the other hand, only the leakage inductances in the electric circuit act, which normally will be very much smaller than the self-inductance of the primary winding.

However, if the current $I_p$ flowing through primary winding 3 is so small at the firing times that the current $I_{s1} \approx N_0/N_1 \, I_p$ induced in the secondary winding 4 is less than the latching current $I_{e1}$ of thyristors 5, 6, then switching cannot be performed by thyristors 5, 6. In this case, thyristors 7, 8 of the second thyristor switch are fired, where the induced current $I_{s2} \approx N_0/N_2 I_p \approx N_1/N_2 I_{s1}$ is substantially greater and therefore exceeds the necessary latching current $I_{e2}$ much sooner.

In the range of variation of the primary current which the thyristor circuit according to the invention is supposed to cover, no gaps must appear and an overload of thyristors 7, 8 must be prevented. To that end, thyristors 4, 5 must discharge the former before the current through them reaches their maximum forward current $I_{m2}$. For this purpose, the primary current value, at which the current through thyristors 5, 6 can reach their latching current $I_{e1}$, must be at least smaller than the value at which the current through thyristors 7, 8 reaches their maximum forward current $I_{m2}$, i.e., at least $I_{e1}N_1 < I_{m2}N_2$ must be valid.

This relation establishes an upper limit for the factor $N_1/N_2$ for most applications and therefore for the attainable expansion of the admissible range of variation of the primary current. How great this factor is selected to be in a particular case depends of course also on the requirements for the thyristor circuit which result from the specific application.

If necessary, the circuit described above, as also the one described below, can be expanded by additional stages. Of course, the effect of the different transformation of the primary current in the individual stages can be promoted by suitable choice of the thyristor switches.

Also, between a first primary connection 1 and a second primary connection 2, the thyristor circuit according to FIG. 2 exhibits a winding 3' with $N_0$ turns, which is parallel to a first bipolar thyristor switch with thyristors 5, 6.

According to the invention there is a second thyristor switch consisting of thyristors 7, 8, which bridges a part of the winding with $N_2 < < N_1 = N_0 - N_2$ turns.

If the current flows entirely through winding 3' in the thyristor circuit inserted in an electric circuit, the current again produces the total self-inductance. If the first thyristor switch conducts, then winding 3' is short-circuited and the inductance is thereby cut off.

If the current flowing in an electric circuit at the firing times is smaller than the necessary latching current $I_e$ of the first thyristor switch, then a short circuit by means of the first thyristor switch is again not possible.

A current $I_S \approx N_1/N_2 I > > I$ is induced in the part of the winding, bridged by second thyristor switch, because of an inductive coupling with the remaining part of winding 3' at firing of thyristors 7, 8. This current is superposed on the thyristor current I flowing in the electric circuit and, of course, is sufficient to bring thyristors 7, 8 to latching much sooner than current I by itself. The effective inductance in the electric circuit is reduced by short-circuiting of a part of the winding to the leakage inductance between the two parts of the winding.

The thyristor circuit according to FIG. 3 formed as a power supply device also exhibits a primary coil 3 between two primary connections 1, 2. Primary coil 3 can, for example, be part of a high-voltage line, its number of windings $N_0$ is generally small, optionally, only one. A bipolar thyristor switch, consisting of thyristors 5, 6, whose cathodes are grounded, and diodes 9, 10 is connected parallel to a first secondary winding 4 with a number of turns $N_1$. A full-wave rectifier, consisting of diodes 12, 13, 14, 15 and a capacitor 16, whose poles, one of which is grounded, are connected to output terminals 17, 18, is connected on an output side to a second winding 11 with a number of turns $N_2 < < N_1$ which is inductively closely coupled to the first winding.

A regulator 19, which is connected to two measuring inputs parallel to outputs 17, 18, controls a first firing pulse generator 20, at whose outputs the gates of thyristors 5, 6, are placed.

According to the invention, the thyristor circuit includes parallel to second secondary winding 11 a second pair of thyristors 7,8 with grounded cathodes, which with diodes 12, 13, form another bipolar thyristor switch. Their gates are placed at the outputs of a second firing pulse generator 21, with which a delay element 22, controlled by regulator 19, is connected in series.

The function of the thyristor circuit will be illustrated more in detail below with the help of the diagram shown in FIG. 4, which will illustrate the timing waveforms of some currents and voltages occurring in it.

An ac current of constant frequency and of an amplitude increasing from small to larger values flows through primary winding 3. Thereby a current is induced in the second secondary winding 11 and is transformed by a following rectifier into a variable direct current $I_c$ which charges capacitor 16. Even before the end of the first half-wave, voltage $U_c$ on capacitor 16 reaches its maximum value $U_m$, whereupon regulator 19 delivers a signal, which activates firing pulse generator 20 and a delay element 22. Firing pulse generator 20 delivers a firing pulse $U_{z1}$ to thyristors 5, 6. The current $I_{s1} \approx N_0/N_1 I_p$ induced in the first secondary coil 4 is, however, less than the latching current $I_{e1}$ of the thyristors and they again cut off after the end of the firing pulse $U_{z1}$.

Delay element 22 passes with a delay to second firing pulse generator 21 a signal received from regulator 19, which corresponds at least to the maximum firing delay of thyristors 5, 6. Generator 21 delivers a firing pulse $U_{z2}$ to thyristors 7, 8. Since the current $I_{s2} \approx N_0/N_2 I_p$ induced in the second secondary coil 11 is much greater than $I_{s1}$ because of $N_2 < < N_1$, it exceeds the latching current $I_{e2}$ of thyristors 7, 8, the thyristor corresponds to the polarity of the half-wave conducts until the end of the half-wave and short-circuits the power supply, so that capacitor 16 is not charged again. Correspondingly, capacitor 16, which constantly delivers current by output terminals 17, 18 to the connected devices, is recharged by the second half-wave.

From the third half-wave, the current $I_{s1}$, induced in the first secondary winding 4 at the firing time, exceeds the latching current $I_{e1}$ of thyristors 5, 6. Therefore, it is short-circuited to the end of the half-wave. The voltage on second secondary winding 11 immediately collapses at firing of thyristors 5, 6, so that current no longer flows in capacitor 16 and also thyristors 7, 8, reached by delayed firing pulse $U_{z2}$, cannot fire.

Figure 5:
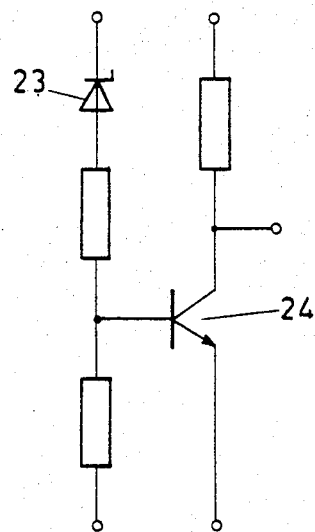

FIG. 5 shows a possible embodiment of regulator 19. In this case, a transistor 24, on whose collector the signal output of regulator 19 is placed, is controlled by a Zener diode 23 and a voltage divider, which are placed between the measuring inputs.

Figure 6:
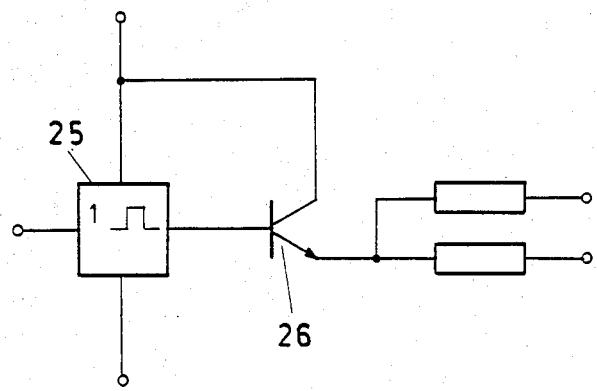

Firing pulse generators 20, 21, as shown in FIG. 6, can be formed with a one shot 25, which controls a transistor 26.

Delay element 22 can be a one shot. The supply voltage for regulator 19, firing pulse generator 20, 21 and delay element 22 can be taken off parallel to output terminals 17, 18.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A thyristor circuit comprising:
   a transformer comprising plural inductively coupled windings including a first winding having two primary connections for connecting of the thyristor circuit to an electric circuit, and a second winding;
   at least a first bipolar thyristor switch connected between a first two connections of said second winding being able to make a direct short-circuit across said second winding;
   at least a second bipolar thyristor switch connected between a second two connections of said second winding being able to bridge a portion of said second winding; and
   said second winding having $N_1$ turns between the first two connections and $N_2$ turns between the second two connections, wherein $N_2 < N_1$.

2. A thyristor circuit according to claim 1, wherein said first winding comprises a primary winding, said second winding comprises a secondary winding, said second bipolar thyristor switch has a maximum forward current, said first bipolar switch has a latching current, and the product between the maximum forward current of the second bipolar switch and the number of turns $N_2$ of said second bipolar thyristor switch is greater than the product between the latching current and the number of turns $N_1$ of said first bipolar thyristor switch.

3. A circuit for producing a regulated d.c. current, comprising:
   a transformer comprising plural inductively coupled windings including a first winding having two primary connections for connecting of the thyristor circuit to an electric circuit, and a second winding;
   at least a first bipolar thyristor switch connected between a first two connections of said second winding;
   at least a second bipolar thyristor switch connected between a second two connections of said second winding;
   said second winding having $N_1$ turns between the first two connections and $N_2$ turns between the second two connections, wherein $N_2 < N_1$;
   a full-wave rectifier connected to said first connections of said secondary windings, said full-wave rectifier having an output;
   a smoothing capacitor connected to said output of said full-wave rectifier;
   a regulator connected to the capacitor and the output of said full-wave rectifier for producing an output signal if the voltage at the output of said rectifier exceeds a predetermined value;
   at least a first firing pulse generator having a trigger input connected to the output of said regulator for producing a firing output connected to a triggering input of said first bipolar thyristor switch;
   a delay circuit connected to the output of said regulator;
   a second firing pulse generator connected to an output of said delay circuit and having an output connected to a triggering input of said second bipolar thyristor switch, said delay circuit exhibiting a delay time greater than a firing delay of said first bipolar thyristor switch.

4. A circuit according to claim 3, wherein said first winding comprises a primary winding, said second winding comprises a secondary winding, said second bipolar thyristor switch has a maximum forward current, said first bipolar switch has a latching current, and the product between the maximum forward current of the second bipolar switch and the number of turns $N_2$ of said second bipolar thyristor switch is greater than the product between the latching current and the number of turns $N_1$ of said first bipolar thyristor switch.

5. A circuit according to claim 4, comprising:
   plural of said second bipolar thyristor switches each connected to respective connections of said second windings, wherein for each additional of said second bipolar thyristor switches the product between the maximum forward current and the number of winding turns bridged by said additional bipolar thyristor switch is greater the product between the latching current and the number of winding turns bridged by the preceeding second bipolar thyristor switch; and
   each additional second bipolar thyristor switch having associated therewith a respective delay circuit which delays the output of said rectifier by a delay time which is greater than the sum of the firing delay of the preceding second bipolar thyristor switch and the delay time of the delay circuit associated therewith.

6. A circuit according to claim 5, wherein the delay circuit associated with each additional second bipolar thyristor switch is connected in series with the delay circuit of the preceeding second bipolar thyristor switch.

* * * * *